United States Patent [19]

Hühne et al.

[11] 4,235,773
[45] Nov. 25, 1980

[54] TRISAZO DYESTUFFS CONTAINING A NAPHTHOLAMINO SULFONIC ACID COMPONENT AND A PHENYLCARBONYLAMINO-PHENYL COMPONENT

[75] Inventors: Volker Hühne; Carl Taube, both of Leverkusen; Reiner Ditzer, Cologne, all of Fed. Rep. of Germany

[73] Assignee: Bayer Aktiengesellschaft, Leverkusen, Fed. Rep. of Germany

[21] Appl. No.: 752,737

[22] Filed: Dec. 21, 1976

Related U.S. Application Data

[63] Continuation of Ser. No. 232,295, Mar. 6, 1972, abandoned.

[30] Foreign Application Priority Data

Mar. 6, 1971 [DE] Fed. Rep. of Germany ....... 2110772

[51] Int. Cl.³ .................. C09B 35/32; D06P 3/04; D06P 3/24; D06P 3/60
[52] U.S. Cl. ............................ 260/173; 260/141; 260/178; 260/181
[58] Field of Search ............... 260/171, 172, 173

[56] References Cited

U.S. PATENT DOCUMENTS

| | | | |
|---|---|---|---|
| 1,904,820 | 4/1933 | Brightman | 260/173 X |
| 2,138,991 | 12/1938 | Anderson et al. | 260/169 |
| 2,196,028 | 4/1940 | Roos | 260/166 |
| 2,659,721 | 11/1953 | Bossard et al. | 260/172 |
| 2,710,859 | 6/1955 | Kehrer et al. | 260/172 |
| 2,714,587 | 8/1955 | Neier et al. | 260/172 X |
| 2,777,838 | 1/1957 | Huss et al. | 260/168 |
| 2,833,756 | 5/1958 | Fleischhauer | 260/171 |
| 2,885,390 | 5/1959 | Huss et al. | 260/144 |
| 3,135,733 | 6/1964 | Taube et al. | 260/168 |

Primary Examiner—Floyd D. Higel
Attorney, Agent, or Firm—Sprung, Felfe, Horn, Lynch & Kramer

[57] ABSTRACT

Trisazo dyestuffs of the formula

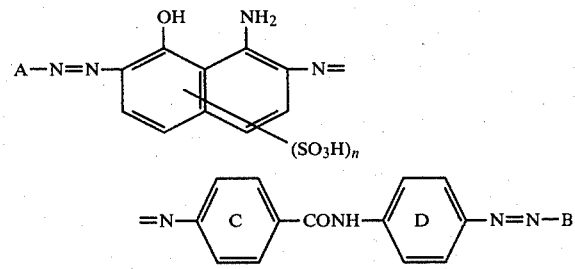

wherein A, B, n, C and D have the meaning given in the description. The new dyestuffs are outstandingly suitable for dyeing natural or synthetic fibre materials containing hydroxyl groups or containing nitrogen, for example cellulose fibres in all states of processing, especially cotton and regenerated cellulose, and also wool, wool/cellulose union, silk, nylon, leather and paper. Dyeings obtained show good fastness properties, especially good fastness to water and to perspiration following an after treatment with cationic auxiliaries.

4 Claims, No Drawings

TRISAZO DYESTUFFS CONTAINING A NAPHTHOLAMINO SULFONIC ACID COMPONENT AND A PHENYLCARBONYLAMINO-PHENYL COMPONENT

This is a continuation of application Ser. No. 232,295, filed Mar. 6, 1972, now abandoned.

The subject of the present invention are trisazo dyestuffs of the general formula

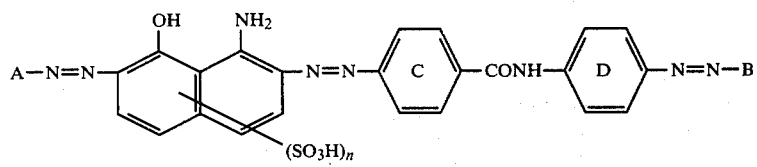

(I)

wherein
A = a radical of an aromatic-carbocyclic or aromatic-heterocyclic diazo component,
B = a radical of a coupling component of the benzene series and
n = 1 or 2, and the rings C and D can possess further substituents.

Preferred dyestuffs are those of the formula

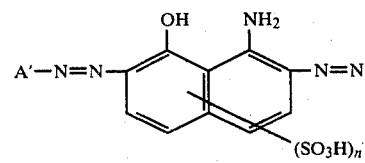

(II)

wherein
A' = phenyl, chlorophenyl, nitrophenyl or sulphophenyl;
B' = 4-hydroxy-phenyl, 2,4-diaminophenyl, 2,4-diamine-5-methyl-phenyl, 2,4-diamino-5-nitrophenyl, 1-amine-3-hydroxy-phenyl, 2-hydroxy-(2'-methylphenylamino)-phenyl or 2-acylamino-4-dialkylaminophenyl and
n = 2.

Within the dyestuffs of the formula (II), those of the formulae

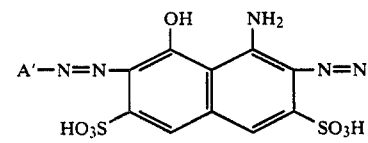

wherein
A' and B' have the abovementioned meaning, are particularly preferred.

Suitable radicals A are, for example, phenyl, halogenophenyl such as chlorophenyl or bromophenyl, alkylphenyl such as methylphenyl or ethylphenyl, alkexyphenyl such as methoxyphenyl or ethoxyphenyl, nitrophenyl, sulphophenyl, the radical of dehydrothiotoluidinesulphonic acid and benzthiazolyl-(2).

Suitable radicals B are, for example, hydroxyphenyl, hydroxymethylphenyl, hydroxyethylphenyl, aminehydroxyphenyl, diaminophenyl, diaminomethylphenyl, diaminonitrophenyl and (methylphenylamino)-hydroxyphenyl.

As examples of substituents of the rings C and D there may be mentioned $C_1$-$C_4$-alkyl such as methyl, ethyl, propyl and butyl, and halogens such as chlorine and bromine.

The new dyestuffs of the formula (I) are obtained in a manner which is in itself known, by acid coupling, on one side only, of tetrazetised diamines of the formula

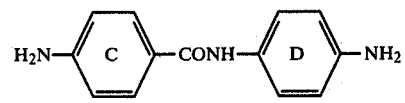

(IV)

wherein the rings C and D can possess further substituents, to aminohydroxynaphthalenesulphonic acids of the formula

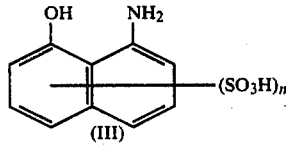

(V)

wherein n can = 1 or 2, subsequent alkaline coupling of the resulting monoazo dyestuffs of the formula

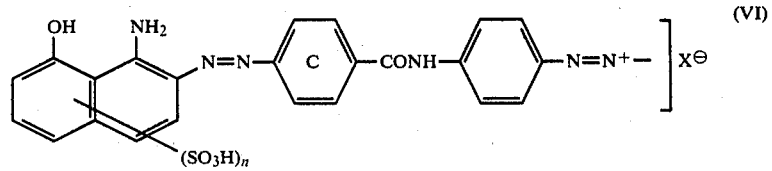

(VI)

wherein X⊖ represents an anion, preferably the anion of an inorganic acid such as sulphuric acid or hydrochloric acid, to diazotised amines of the formula

   (VII)

to give disazo dyestuffs of the formula

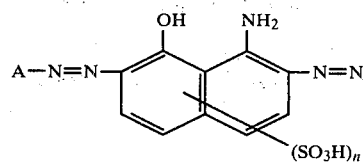   (VIII)

and subsequent alkaline coupling with coupling components of the formula

The acid coupling to one side only takes place in a manner which is in itself known, preferably in an aqueous medium containing mineral acid, whilst the alkaline coupling preferably takes place in an aqueous alkaline medium.

Suitable diamines (IV) are, for example: 4-amino-benzoyl-4'-amino-anilide, 4-amino-2-chloro-benzoyl-4'-amino-anilide, 4-amino-3-methyl-benzoyl-4'-amino-anilide, 4-amino-benzoyl-4'-amino-2'-chloro-anilide and 4-amino-benzoyl-4'-amino-3'-methyl-anilide.

Suitable amines (VII) are, for example, aniline, 2-chloro-aniline, 3-chloro-aniline, 4-chloro-aniline, 1-aminobenzene-2-sulphonic acid, 1-amino-benzene-3-sulphonic acid, 1-aminobenzene-4-sulphonic acid, 1-amino-2-methyl-benzene, 1-amino-4-methyl-benzene, 1-amino-2-nitro-benzene, 1-amino-4-nitro-benzene, 1-amino-4-methoxy-benzene, dehydrothiotoluidinesulphonic acid and 2-amino-benzthiazole.

Suitable coupling components (IX) are, for example, phenol, 1,3-diamino-benzene, 1-amino-3-hydroxy-benzene, 1,3-diamino-4-methylbenzene, 1,3-diamino-4-nitro-benzene, 1-hydroxy-3-(2'-methylphenylamino)-benzene and 1-acetylamino-2-diethylamino-benzene.

Suitable amino-hydroxy-naphthalenesulphonic acids (V) are, for example, 1-amino-8-hydroxy-naphthalene-3,6-disulphonic acid, 1-amino-8-hydroxy-naphthalene-4,6-disulphonic acid and 1-amino-8-hydroxy-naphthalene-4-sulphonic acid.

The new dyestuffs are outstandingly suitable for dyeing natural or synthetic fibre materials containing hydroxyl groups or containing nitrogen, for example cellulose fibres in all states of processing, especially cotton and regenerated cellulose, and also wool, wool/cellulose union, silk, nylon, leather and paper. Green to black dyeings having good fastness properties, especially good fastness to water and to perspiration following an after-treatment with cationic auxiliaries, are obtained.

EXAMPLE 1

22.7 parts of 4-amino-benzoyl-4'-amino-anilide in a mixture of 23 parts of water and 56 parts of 30% strength aqueous hydrochloric acid are tetrazotised with 13.8 parts of sodium nitrite at 0°–10° C., whilst adding ice. After neutralising with sodium carbonate solution to pH 1, 29.3 parts of 1-amino-8-hydroxy-naphthalene-3,6-disulphonic acid, which have beforehand been dissolved in 150 parts of water to give a neutral solution, are run in. The mixture is neutralised with sodium acetate solution to pH 2.5 over the course of 2.5 hours. After stirring for several hours at 12°–15° C., the coupling on one side is complete. 8.7 parts of aniline are diazotised in a known manner and this diazotised product is added to the product of the one-sided coupling reaction which has beforehand been cooled to 0°. The mixture is then brought to a pH-value of 9.5 with sodium carbonate. After stirring for 3 hours, the aniline coupling is complete. A solution of 10.1 parts of 1,3-diamino-benzene in 30 parts of water is then added. The dyestuff precipitates and after stirring overnight is filtered off and dried. It dyes cotton black.

Further dyestuffs which can be manufactured according to the invention are summarised according to components in the table which follows, their dyeing properties being indicated.

| Ex. No. | A—NH₂ | (structure with OH, NH₂, (SO₃H)ₙ) | H₂N—C—CONH—D—NH₂ | H—B | Colour Shade on Cotton |
|---|---|---|---|---|---|
| 2 | Aniline | 1-Amino-8-hydroxy-naphthalene-3,6-disulphonic acid | 4-Amino-benzoyl-4'-amino-anilide | Phenol | green |
| 3 | " | 1-Amino-8-hydroxy-naphthalene-3,6-disulphonic acid | 4-Amino-benzoyl-4'-amino-anilide | 1-Amino-3-hydroxy-phenol | black |
| 4 | " | 1-Amino-8-hydroxy-naphthalene-3,6-disulphonic acid | 4-Amino-benzoyl-4'-amino-anilide | 1,3-Diamino-4-methyl-benzene | " |
| 5 | " | 1-Amino-8-hydroxy-naphthalene-3,6-disulphonic acid | 4-Amino-benzoyl-4'-amino-anilide | 1,3-Diamino-4-nitro-benzene | green |
| 6 | 1-Amino-benzene-4-sulphonic acid | 1-Amino-8-hydroxy-naphthalene-3,6-disulphonic acid | 4-Amino-benzoyl-4'-amino-anilide | 1,3-Diamino-benzene | black |
| 7 | 1-Amino-ben- | 1-Amino-8-hydroxy-naphthalene-3,6- | 4-Amino-benzoyl-4'-amino-anilide | 1-(2'-Methylphenyl-amino)-3-hydroxy- | " |

-continued

| Ex. No. | A—NH₂ | 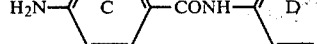 (SO₃H)ₙ | H₂N—C—CONH—D—NH₂ | H—B | Colour Shade on Cotton |
|---|---|---|---|---|---|
|  | zene-4-sulphonic acid | disulphonic acid |  | benzene |  |
| 8 | 1-Amino-benzene-4-sulphonic acid | 1-Amino-8-hydroxy-naphthalene-3,6-disulphonic acid | 4-Amino-benzoyl-4'-amino-anilide | 1-Acetylamino-3-diethylamino-benzene | " |
| 9 | 1-Amino-2-chloro-benzene | 1-Amino-8-hydroxy-naphthalene-3,6-disulphonic acid | 4-Amino-benzoyl-4'-amino-anilide | Phenol | green |
| 10 | 1-Amino-2-chloro-benzene | 1-Amino-8-hydroxy-naphthalene-3,6-disulphonic acid | 4-Amino-benzoyl-4'-amino-anilide | 1,3-Diamino-benzene | black |
| 11 | 1-Amino-4-nitro-benzene | 1-Amino-8-hydroxy-naphthalene-3,6-disulphonic acid | 4-Amino-benzoyl-4'-amino-anilide | 1,3-Diamino-benzene | " |
| 12 | 1-Amino-4-nitro-benzene | 1-Amino-8-hydroxy-naphthalene-3,6-disulphonic acid | 4-Amino-benzoyl-4'-amino-anilide | 1-Amino-3-hydroxy-benzene | " |
| 13 | 1-Amino-4-methyl-benzene | 1-Amino-8-hydroxy-naphthalene-3,6-disulphonic acid | 4-Amino-benzoyl-4'-amino-anilide | Phenol | green |

DYEING EXAMPLE 260 ml of water at 50°–60° C. are first introduced into a dyeing beaker of 500 ml capacity, located in a water-bath which can be heated, and 10 ml of 10% strength sodium sulphate solution and 1 ml of 10% strength sodium carbonate solution are added. 0.25 g of dyestuff is thoroughly worked into a paste with 2 ml of cold water and 30 ml of warm water (50°–60° C.) are added; hereupon, the dyestuff dissolves. The dyestuff solution is added to the liquor first introduced, and 10 g of cotton fabric are constantly agitated in this dyeing liquor. The temperature of the dyeing liquor is raised to 85°–90° C. over the course of 30 minutes and dyeing is continued for 60 minutes at this temperature. The dyed material is taken out of the dyeing liquor, the adhering liquor is removed by wringing out, and the material is rinsed with cold water for 5–10 minutes and dried at 60°–70° C.

We claim:
1. Triasazo dyestuff of the formula

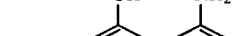

wherein
A' is phenyl, chlorophenyl, nitrophenyl or sulphophenyl,
B' is 4-hydroxy-phenyl, 2,4-diaminophenyl, 2,4-diamino-5-methyl-phenyl, 2,4-diamino-5-nitrophenyl, 1-amino-3-hydroxy-phenyl, 2-hydroxy-(2'-methylphenylamino)-phenyl or 2-acylamino-4-dialkylaminophenyl.

2. The trisazo dyestuff of claim 1 having the formula

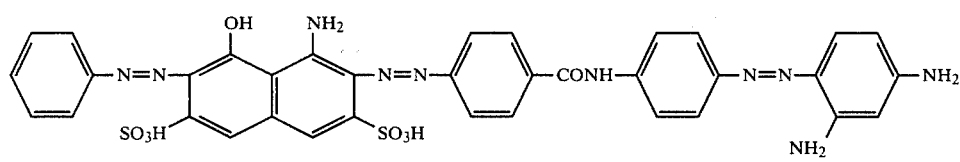

3. The trisazo dyestuff of claim 1 having the formula

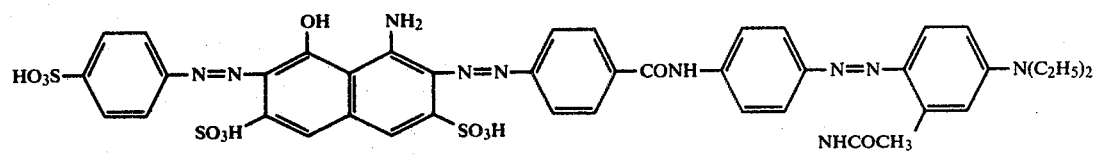
4. The trisazo dyestuff of claim 1 having the formula
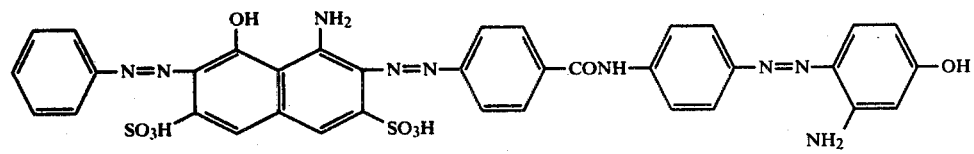
* * * * *